Patented Oct. 5, 1926.

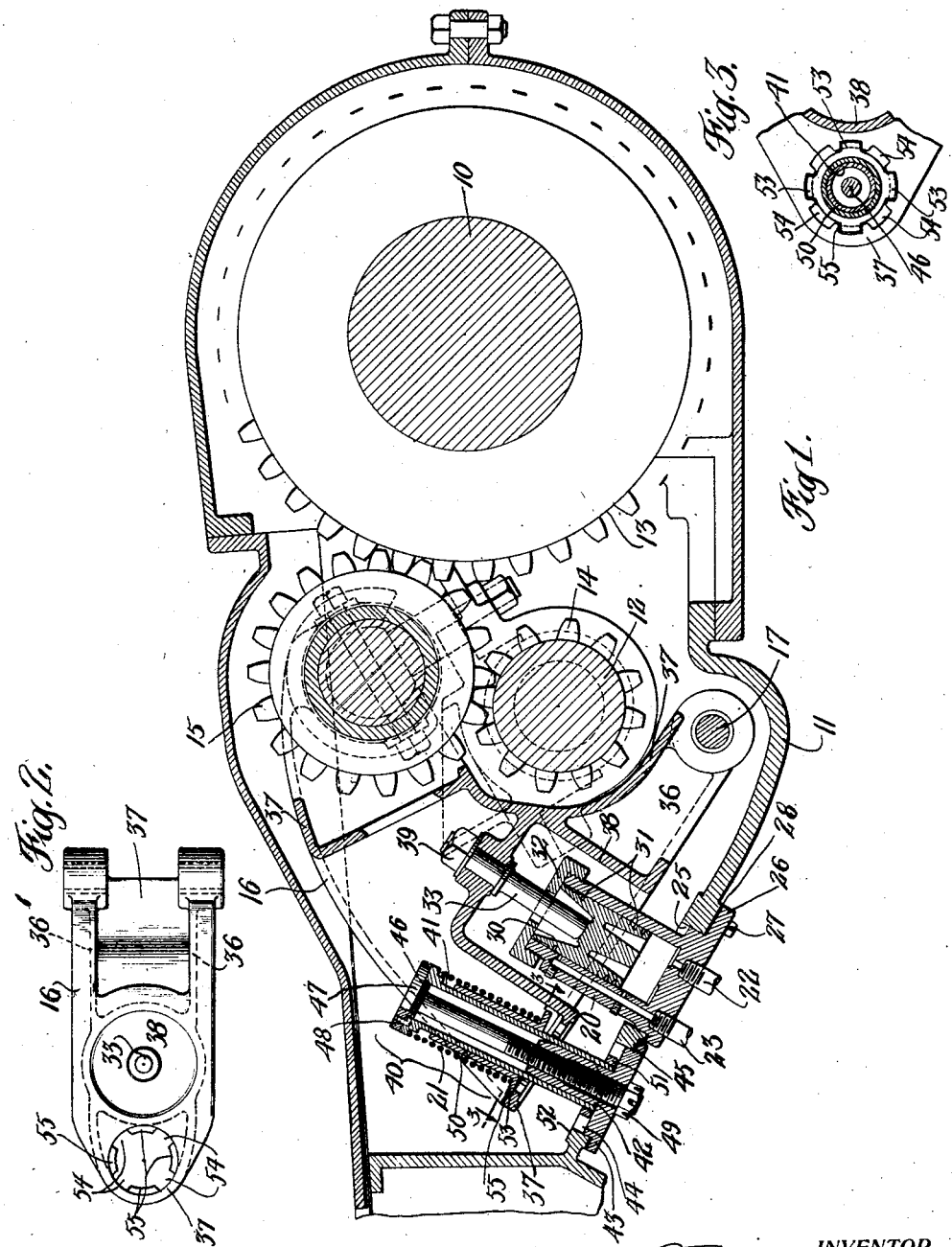

1,602,120

UNITED STATES PATENT OFFICE.

FRANK RICHARD PETERS, OF NEW YORK, N. Y., ASSIGNOR TO FRANKLIN RAILWAY SUPPLY COMPANY, A CORPORATION OF DELAWARE.

RAILWAY BOOSTER.

Application filed June 13, 1924. Serial No. 719,718.

My invention relates to railway boosters such as are used on the trucks of railway vehicles to assist in their propulsion, and especially on the trailer trucks of locomotives. In general, such a booster serves to increase the tractive power in starting and at slow speeds, by making drivers of wheels which would otherwise be idle; but the booster is not ordinarily intended to drive the train by itself, or to operate at all at high speeds. The invention is particularly concerned with the "gear clutch" arrangements of such boosters (as they are commonly termed), employed for connecting or disconnecting the booster to or from the vehicle axle which it drives. I aim to provide simple and reliable mechanism for this purpose, and to facilitate cleaning or repair of the parts more frequently requiring either, and particularly the motor device and any accessory parts for effecting "entrainment" or "disentrainment" of the booster, as it is called.

In the drawing, Fig. 1 shows a longitudinal section through a booster gear clutch mechanism conveniently embodying my invention.

Fig. 2 shows a bottom view of a shiftable "gear clutch" member that appears in section in Fig. 1.

Fig. 3 is a fragmentary top view of the same gear clutch member and certain associated parts, some of the parts being shown in section as indicated by the line 3—3 in Fig. 1.

The drawings show the booster driven axle 10 and a portion of the booster casing and bed plate or frame 11. As shown, the gearing for connecting the axle 10 to the crank shaft 12 of the booster engine (not shown) comprises a gear 13 on the axle 10, a pinion 14 on the crank shaft 12, and an idler pinion 15 mounted on a shiftable gear clutch member 16, preferably arranged as a rocker. This rocker 16 need not necessarily be fulcrumed on the crank shaft 12, but may be otherwise mounted, as on a pivot 17 below the crank shaft. The idler pinion 15 is always in mesh with the crank shaft pinion 14, and is swung into and out of mesh with the axle gear 13 by a motor device 20 and an opposing spring 21. Preferably, the rocker 16 is overbalanced some 30 per cent toward a position out of mesh with the gear 13, to insure proper operation even if the spring 21 should break.

To throw the gears 15, 13 into mesh and keep them in mesh, pressure from the booster control system (not shown) is admitted to the motor cylinder 20 through a pipe 22 (the pipe 23 also shown is for conveying pressure from the cylinder 20 to other parts of the booster control system), so as to thrust the rocker 16 to the right (clockwise), away from the adjacent lower wall of the casing 11. When the pressure in the cylinder 20 is exhausted or relieved, on the other hand, the rocker 16 automatically swings to the left (counter-clockwise) and throws the idler pinion 15 out of mesh with the axle pinion 13. These operations of connecting the crank shaft 12 to the axle 10 and disconnecting it are commonly referred to as "clutching" and "unclutching," or "entraining" and "disentraining" the booster.

As here shown, the motor cylinder 20 is detachably mounted on the lower wall of the booster casing 11, at an opening 25. For this purpose, it is provided with a flange 26 bolted to the wall around the opening, as indicated at 27, a gasket 28 being preferably interposed to make a tight joint and prevent oil from leaking out of the casing 11 when splash lubrication is employed for the booster. In the present instance, the cylinder 20 extends inward from the flange 26, so that it is practically altogether within the casing 11. The piston 30 in the cylinder 20 is here shown as hollow, and considerably elongated, to afford ample bearing, as well as ample room for packing grooves 31. Suitable stop means may be provided for limiting the outward movement of the piston 30 in the cylinder 20, such, for example, as an apertured cap 32 screwed on the outer end of the cylinder. In the present instance, the piston 30 acts on the rocker 16 through an actuating rod 33 that extends through the aperture of the cap 32 and engages the piston web.

To economize space and facilitate a convenient arrangement of the parts, the rocker 16 may preferably be recessed or otherwise suitably formed to receive the operating cylinder 20, as well as to extend around the crank shaft 12 and its gear 14. In the present instance, the rocker 16 comprises, as its main strength elements, two parallel walls 23,—and thus rendered completely accessible for disassembly, cleaning, repacking, or other repairs. This can be done from beneath the booster, without the extreme inconvenience and difficulty involved in anything that requires access to the top of the booster, close under the locomotive ashpan or other parts. In itself, also, the motor 20 is extremely simple and rugged, and very easy to manufacture, assemble, disassemble, and repair. In like manner, the spring assembly 40 can be removed by unscrewing the nut 49 and taking off the cover 43, lifting the collar lugs 53 out of the recesses 55 and turning them till they register with the slots 54, and then withdrawing the whole assembly.
or plates 36 with suitable cross-connecting webs 37 at various points. It may conveniently be cast all in one piece. Unlike its recess for the gear 14, the feature of the rocker 16 that accommodates the cylinder 20 is not a mere bend in the rocker edge, but rather a cylindrical opening 38 with wall merging into the rocker sides 36. The actuating rod 33 may be interposed between the bottom of this recess 38 and the bottom of the corresponding end recess of the piston 30. Preferably, the rod 33 is in the nature of a shouldered stud secured by a nut 39 in a hole in the bottom wall of the recess 38.

The spring 21 for actuating the gear clutch member 16 is here shown as forming part of a unitary spring assembly 40. As shown, it is a helical compression spring, and is interposed between an apertured portion of a rocker web 37 and an external flange on an abutment sleeve member 41 around which the said spring is mounted. This sleeve 41 is, in turn, mounted around an externally flanged hollow hub or stud 42 on a rabbetted cover plate 43 that closes an opening 44 in the casing wall beyond the motor opening 25 (speaking with reference to the rocker fulcrum 17), and is bolted to the wall around the opening,—a gasket 45 being preferably interposed to make a tight joint. The sleeve 41 is secured in place by a bolt 46 with rabbetted head 47 screwed into the upper end of the sleeve and locked by a key or pin 48. The bolt 46 extends through the hub 42, and a nut 49 on its lower end holds the lower end of the sleeve 41 firm against the cover plate 43. Preferably, a flanged collar 50 is arranged loose around the sleeve 41, to serve as a seat for the spring 21 on the rocker web 37. A nut 51 is screwed on the lower end of the sleeve 41, to hold the collar 50 on the sleeve. Around the casing opening 44 is a ridge 52 that serves as a stop for limiting the unclutching movement of the rocker 16. Thus abutment member 41 with its bolt 46, spring 21, and collar 50 constitute a unitary assembly 40 that can be conveniently put in place or removed as such. To permit this to be done without opening up the booster casing 11, the flange of the collar 50 may be mutilated as shown in Fig. 3, so as to consist, in effect, merely of a number spaced lugs 53, and the web 37 may be provided with corresponding slots 54 adapted to pass these lugs and depressions 55 between the slots for seating the lugs and preventing the collar from turning.

With the construction described, it will be seen, the motor 20 can be unbolted from the casing 11 and withdrawn through the opening 25 without opening up the casing or disturbing any of the other parts,—except, perhaps, the control connections 22,

I claim:

1. The combination with a booster casing having an opening in its wall, of a gear clutch motor detachably mounted at said opening.

2. The combination with a booster casing having an opening in its wall, of a gear clutch motor detachably mounted on the apertured wall and removable through the opening.

3. The combination with a booster casing having an opening in its wall and a shiftable gear clutch member in said casing adjacent said opening, of a piston motor with cylinder detachably mounted at said opening, and an actuating rod carried by said member for extending into said cylinder and engaging said piston.

4. The combination with a booster casing having an opening in its wall and a shiftable gear clutch member in said casing adjacent said opening, of a motor comprising a cylinder detachably mounted in said opening, a hollow piston in the cylinder and a detachable stop for said piston at the inner end of the cylinder, and an actuating rod on said member extending into the cylinder for engaging the piston.

5. The combination of a booster casing with an opening in its wall and a shiftable gear clutch member adjacent said opening, spring means urging said member toward said wall, but removable through an opening therein and a piston motor detachably mounted in said opening for pushing said member away from said wall.

6. The combination with a booster casing and a shiftable gear clutch member therein, of a piston motor with cylinder on the casing wall, with a shiftable gear clutch member in the casing recessed to receive the cylinder and actuated by the motor piston.

7. The combination with a booster casing and a shiftable gear clutch member therein, of a piston motor with cylinder on the casing wall, and an actuating rod on said member for extending into said cylinder and engaging the piston.

8. The combination of a booster casing and a piston motor with cylinder projecting inward from the casing wall, a shiftable gear clutch member in the casing recessed to receive the cylinder, and an actuating rod interposed between the motor piston and the bottom of the recess of said member.

9. The combination of a booster casing and a piston motor with cylinder projecting inward from the casing wall, a gear clutch rocker in the casing recessed to receive the cylinder, an actuating rod interposed between the motor piston and the bottom of the recess of said member, an abutment extending from the casing wall through said rocker, and a spring operatively interposed between said rocker and said abutment, said spring and abutment being removable through said rocker and casing wall.

10. The combination of a booster casing, a gear clutch rocker in the casing, a pair of openings in the casing, a motor detachably mounted in one of said openings extending upwardly into the casing but removable through said opening and adapted to move the rocker in one direction, and spring means detachably mounted in the other of said openings also extending upwardly into the casing but removable through its opening and adapted to return the rocker.

In testimony whereof, I have hereunto signed my name.

FRANK RICHARD PETERS.